United States Patent [19]
Farokhi et al.

[11] Patent Number: 5,598,990
[45] Date of Patent: Feb. 4, 1997

[54] SUPERSONIC VORTEX GENERATOR

[75] Inventors: Saeed Farokhi; Ray R. Taghavi, both of Lawrence, Kans.

[73] Assignee: University of Kansas Center for Research Inc., Lawrence, Kans.

[21] Appl. No.: 356,646

[22] Filed: Dec. 15, 1994

[51] Int. Cl.⁶ .................................................. B64C 23/06
[52] U.S. Cl. .......................... 244/199; 244/198; 244/200; 296/180.1; 296/180.2; 180/762
[58] Field of Search ...................................... 244/199, 200, 244/198, 130; 280/762; 296/180.1, 180.2, 180.4

[56] References Cited

U.S. PATENT DOCUMENTS

| | | | |
|---|---|---|---|
| 4,354,648 | 10/1982 | Schenk et al. | 244/130 |
| 4,714,197 | 12/1987 | Thayer et al. | 244/12.5 |
| 4,789,117 | 12/1988 | Paterson et al. | 244/130 |
| 4,836,473 | 6/1989 | Aulehla et al. | 244/199 |
| 5,058,837 | 10/1991 | Wheeler | 244/199 |
| 5,186,415 | 2/1993 | Li | 244/76 R |

*Primary Examiner*—Andres Kashnikow
*Assistant Examiner*—Tien Dinh
*Attorney, Agent, or Firm*—Hovey, Williams, Timmons & Collins

[57] ABSTRACT

A vortex generator for attenuating flow separation which occur during supersonic flow of air over structure such as an aircraft airfoil, its fuselage, surfaces forming a part of a jet propulsion unit, turbine or compressor blades, or similar surfaces subjected to supersonic airflow. A series of vortex generators are provided each of which comprises a cavity in the component over which the supersonic air is flowing that is configured to generate a spiral vortex which attenuates flow separation and weight drag resulting from the supersonic airflow. Each cavity is of generally triangular configuration defined by two side walls which diverge in a direction away from the apex of the triangular cavity, and a flat bottom wall joined to the side walls. In an alternate embodiment, means is provided for selectively shifting the bottom wall from a retracted inner position, to an outer location essentially flush with the surface over which the supersonic airflow is occurring.

30 Claims, 3 Drawing Sheets

SUPERSONIC VORTEX GENERATOR

BACKGROUND OF THE INVENTION

1. Field of the Invention

This invention relates to a supersonic vortex generator for structures which are subjected to supersonic airflow that normally results in flow separation, wave drag and other interference with airflow, to attenuate that flow separation, induced drag and airflow interruption.

In particular, the invention concerns vortex generators comprising a series of triangular cavities in an airfoil or other surfaces over which supersonic air is flowing, which are capable of generating a series of initially diverging and then streamwise spiral vortices trailing after the cavities that serve to attenuate flow separation and wave drag penalties.

2. Description of the Prior Art

Flow separation in subsonic airflow over structures such as aircraft airfoils is prevented or lessened by vortex generators that project from the surface of the wing or other structure. The vortex generators primarily consist of a plurality of short, low-aspect-ratio airfoils arranged in pairs extending away from the surface of the airfoil.

In a typical swept wing subsonic aircraft wing application, the vortex generators may comprise a series of relatively short, upstanding blades arranged such that adjacent pairs include one blade that is generally aligned with the path of air over the wing, while an adjacent blade may be at an acute angle of about 20° with respect to the line of flight. The tip vortices of these blade airfoils pull high-energy air down into the boundary layer of the wing and prevent flow separation. Blade vortex generators do not work though in supersonic vehicle applications because of the excessive wave drag penalty that results.

When air at supersonic speed flows over a corner surface that is concave, the flow must remain tangent to the surfaces; hence, the streamline at the corner is deflected to conform to the oblique angle of the turned surface. Whenever a supersonic flow is turned "into itself" an oblique shock wave occurs A similar phenomenon happens when supersonic flow passes over a wedge-shaped object, or a cone-shaped object. Across the shock wave, the Mach number decreases, but the pressure, the temperature and the density of the air increase. The impact with the ground of strong shock waves formed on aircraft during supersonic flight causes a loud sound called a "sonic boom".

Turning of a supersonic flow "away from itself", causes an expansion fan to occur. This expansion wave is in the shape of a fan centered at the corner of the two surfaces which are oblique to one another. The fan continuously opens in a direction away from the corner. The originally horizontal streamline flows ahead of the expansion wave are deflected smoothly and continuously through the expansion wave causing the streamlines behind the wave to be parallel to each other and inclined downwardly at the deflection angle of one surface with respect to the other surface. Across the expansion wave, the Mach number increases, but the pressure, the temperature and the density of the air decrease.

In actual supersonic flight of an aircraft, a combination of shock waves and expansion fans form on different parts of the vehicle depending on their shape and location. Typically, strong shock waves occur at the nose of the aircraft and at the middle section, with expansion fans being formed in the aft body area.

An aircraft wing stalls whenever the smooth airflow over its top surface separates to create a turbulent region over the wing surface. At subsonic speeds, stalls occur at high angle of attack flight conditions because the airflow tends to separate from the top surface of the airfoil, creating a large wake of relatively "dead air" behind the airfoil. Inside of this separated region, the flow is recirculating, and part of the flow actually moves in a direction opposite to the free stream, creating a so-called "reversed flow". The consequence of this separated flow at a high angle of attack is a sudden decrease in lift and a large increase in drag causing a stall.

At supersonic speeds, a stall can occur as a result of shock-induced separation of airflow across the wing or other part of the aircraft, regardless of the angle of attack.

Mach number is the ratio of the aircraft speed to the speed of sound. When a vehicle reaches its critical Mach number, i.e., when it flies at a speed at which the airflow at any portion of its surfaces equals the speed of sound, a shock wave begins to form just behind the point at which the air is moving the fastest. This shock wave oscillates back and forth and causes the air to separate from the upper surface of the airfoil. This flow separation results in loss of lift and can ultimately cause a stall. There is also a concomitant increase in drag and buffeting of control surfaces attached to the trailing edge of the wing. Similar separation conditions can occur on jet propulsion engine intakes, compressor blades, jet engine exhaust nozzles and many other areas of the vehicle.

SUMMARY OF THE INVENTION

This invention relates to a supersonic vortex generator which produces a pair of strong, initially diverging, and then streamwise vortices which delay flow separation and also enhance mixing of supersonic flows. A series of the vortex generators are preferably located along the airfoil or other surface subjected to supersonic airflow, in a string extending transversely of the air stream.

Each vortex generator consists of a triangular cavity in the surface over which the supersonic air is flowing. The cavity is oriented such that the apex thereof faces the air stream. Each cavity is defined in part by opposed, diverging side walls presenting margins between the side walls and the surface of the airfoil which are at angles with respect to the air stream such that the air flowing over the margins generates spiral vortices trailing therefrom that attenuate flow separation and attendant wave drag.

The cavities each have a triangular bottom wall that is connected to opposed diverging side walls. These elongated side walls may be of longitudinally linear configuration, or curved along the length thereof. In a preferred embodiment, each cavity is an isosceles triangle where the base of the bottom wall merges smoothly with the surface of a structure such as an airfoil, a blade, a propulsion engine inlet or outlet, or other similar devices. The cavity has its maximum depth where the two side walls converge in a line extending generally perpendicularly with respect to the airfoil surface.

In another embodiment of the vortex generator, means is provided for shifting the bottom wall from a position presenting a cavity of maximum depth, to a location where the bottom wall is flush with the airfoil surface. Pressure sensors positioned on opposite fore and aft sides of the cavity at the surface level of the airfoil and that are connected to the control mechanism for the movable bottom wall, serve to control positioning of the bottom wall in response to a predetermined difference in pressure on the airfoil surface as sensed by respective sensors.

When used on the wing of an aircraft designed for supersonic flight, a series of the triangular vortex cavities are provided along the span of each wing of the vehicle. The triangular cavities are in a row and oriented with the apex portion of each facing the line of flight. Adjacent cavities are in offset relationship transversely of the flight line. In addition, more than one row of the vortex generating cavities may be provided in the wing structure. Use of the vortex generators is not restricted to the wing structure of a supersonic aircraft. The generators may be used on the fuselage, or the tail airfoils of the plane.

The triangular vortex generators may be used in a number of different supersonic airflow applications such as the exhaust outlet panels of a jet propulsion engine, the inlet ducts of such engine, and other structures subjected to supersonic airflow such as turbine or compressor blades or the like.

DETAILED DESCRIPTION OF THE PREFERRED EMBODIMENTS

Figures 1, 2, 3, 4, 5, 5A, 15:
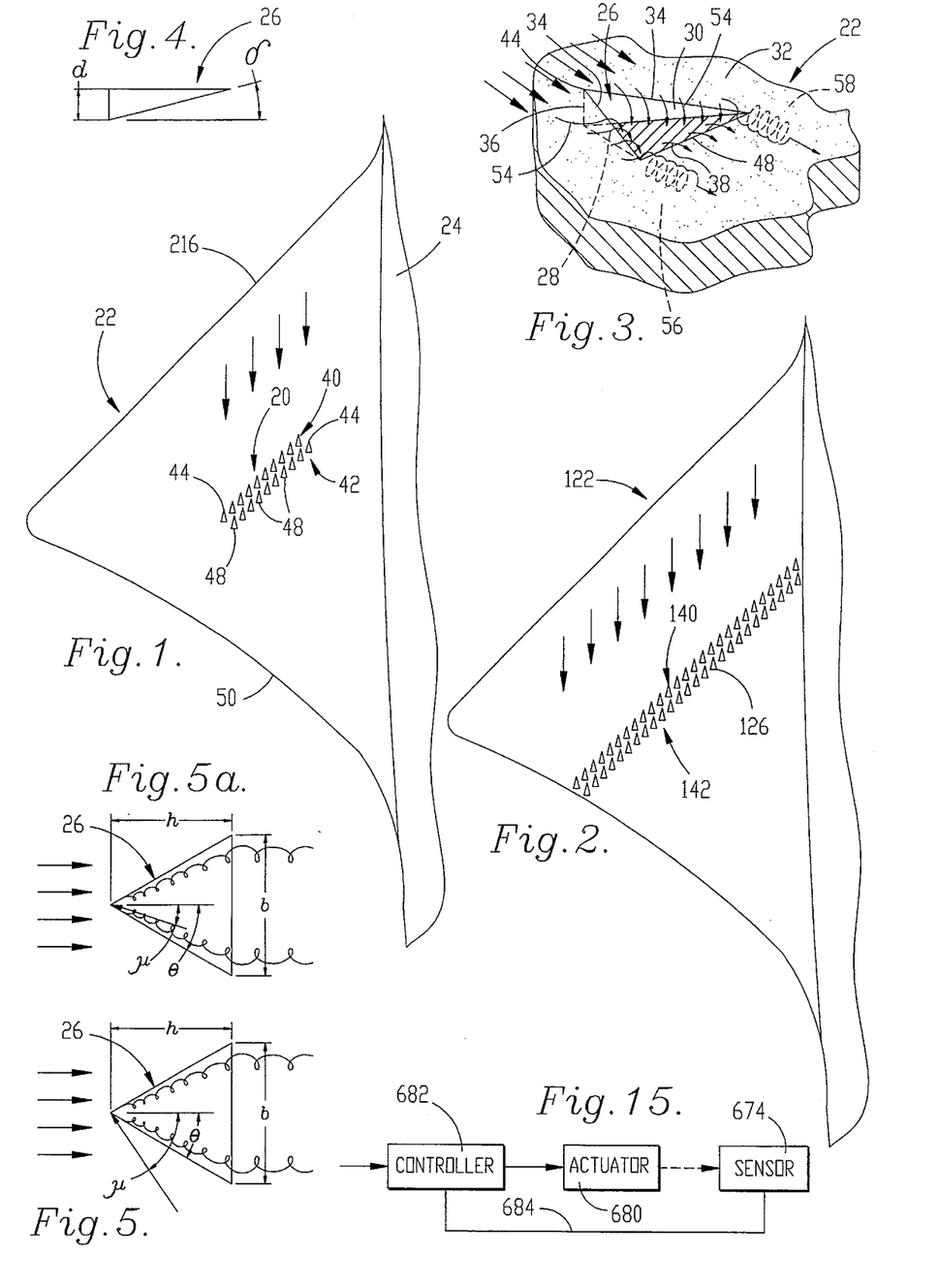
FIG. 1 is a fragmentary essentially schematic representation of a swept wing and part of the fuselage of a supersonic aircraft, illustrating a series of triangular vortex generating cavities embodying the preferred concepts of the present invention, and showing the relative orientation of the cavities with respect to one another.
FIG. 2 is a fragmentary schematic representation of a swept wing as depicted in FIG. 1, and showing a second arrangement of triangular vortex generating cavities constructed and arranged in accordance with the invention.
FIG. 3 is an enlarged, fragmentary schematic representation of a portion of the wing structure as illustrated in FIGS. 1 and 2, which depicts one of the triangular vortex generating cavities, with the vortices generated thereby being represented by respective curved arrows and spiral dashed lines.
FIG. 4 is a schematic depiction of one of the triangular cavities and illustrating the cross sectional shape of the cavity.
FIG. 5 is a schematic plan view of a triangular vortex generating device showing the relative relationship of the Mach angle μ to the vertex half angle θ when the cavity edges are retained within the Mach cone.
FIG. 5a is a schematic plan view of a triangular vortex generating device illustrating the relative relationship of the Mach angle μ to the vertex half angle θ when the cavity edges are outside of the Mach cone.
FIG. 15 is a schematic representation of the control mechanism for actuating the movable bottom wall of each vortex generating cavity of the embodiments shown in FIGS. 10a, 10b and 10c.

A series of supersonic vortex generators of this invention are designated generally by the numeral 20 in FIG. 1 and shown as being integrally incorporated into the swept wing 22 of a supersonic aircraft having a fuselage 24. Only one of the wings 22 is illustrated; however, it is to be understood that a series of vortex generators 20 will also be provided symmetrically in the opposite wing (not depicted).

Referring to FIGS. 3, 4, 5 and 5a, it is to be seen that the series of vortex generators 20 are made up of a number of individual triangular vortex generating cavities each of which is broadly designated by the numeral 26. Each cavity has a pair of opposed diverging side walls 28 and 30 which are also of triangular shape. As most evident from FIG. 3, each of the side walls 30 could be perpendicular or at an angle to the surface 32 of airfoil 22 and has an outermost margin 34 that joins with surface 32. Side walls 28 and 30 merge at the apex of the triangular cavity 26 at a line 36 which also could be perpendicular to surface 32 or inclined at an angle to it. Although a cavity of preferred configuration has elongated side walls 28 and 30 which are longitudinally linear, they may be of curved, concave or convex shape, or a combination of concave and convex along the length thereof.

Triangular bottom wall 38 interconnects the lowermost edges of each of the triangular side walls 28 and 30, and extends rearwardly from the lowermost point from line 36, to the base of the triangular cavity 26 where the bottom wall merges smoothly with surface 32.

The cavities 26 making up the series 20 thereof in FIG. 1, include a first row of cavities 40 directly associated with a second row 42 of cavities 26. The rows 40 and 42 of cavities 26 are located on the surface of airfoil 22 in disposition such that they are upstream of a point of where separation of supersonic air from the wing surface would otherwise occur. Thus, the trailing edge of each cavity 26 should be upstream of the air stream separation point.

It can be seen from FIG. 1 that the row of cavities 40 are oriented in a staggered line causing adjacent individual cavities to be offset from one another in the direction of airflow over wing 22. The stair step arrangement of row 40 is repeated in the orientation of the cavities 26 making up row 42 thereof. It is noteworthy that each of the cavities 26 in rows 40 and 42 thereof, are located such that the apex 44 of each cavity 26 is in closer proximity to the leading edge 216 of wing 22 than the base portions 48 of respective cavities.

It is also to be observed from FIG. 1 that the cavities 26 of each of the rows 40 and 42 are oriented in disposition such that a bisector of each triangular cavity that is generally perpendicular to base portion 48 streamlines with and is parallel to the flight path of the aircraft and thereby the direction of travel of supersonic air over the airfoil 22. It can further be seen from FIG. 1 that each of the triangular cavities 26 of row 42 is located such that the apex 44 of each is within a boundary defined by the base portion 48 of a triangular cavity immediately in front of a corresponding rear row cavity 26.

During flight of the aircraft as shown in FIG. 1 at supersonic speeds, the portion of air flowing across the upper surface 32 of airfoil 22 that encounters each of the cavities 26 spills over margins 34 of side walls 28 and 30 into the interior of a respective cavity 26. Counter rotating, initially diverging vortices are thereby produced which streamline in trailing relationship to a corresponding cavity. This phenomenon is repeated for each of the cavities 26.

The vortices produced by each of the cavities 26 extend toward the trailing edge 50 of airfoil 22, thus attenuating flow separation and wave drag which would otherwise occur during supersonic flight of the aircraft.

Figure 11:
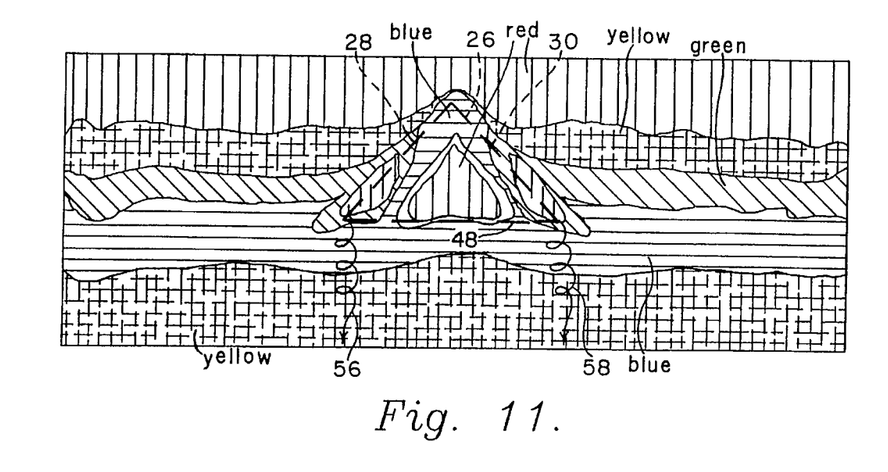
FIG. 11 is a view of the results obtained from a pressure sensitive paint test conducted on a supersonic vortex generator of this invention and illustrating the vortices which emanate from opposed diverging margins of a triangular test cavity.

Thus, a pair of strong streamwise vortices at supersonic speeds are produced by each of the cavities 26. These vortices not only delay flow separation but also enhance mixing of supersonic airflows. FIG. 11 illustrates the results of a test conducted with pressure sensing paints where fluid was caused to flow over a plate having a cavity 26 therein at a supersonic Mach number speed of approximately 1.46. Similar tests were carried out at Mach numbers ranging from about 1.06 to about 2.15. All of these tests demonstrated the effectiveness of cavity 26 in attenuating flow separation.

The paints used were of the type that produce a particular color depending upon the pressure applied to the paint. For example, in a typical pressure paint spectrum, the colors produced show a pressure differential where white is the highest pressure and purple is the lowest pressure applied. The pressure color spectrum therefore extended from white to red to orange to yellow to green to blue to violet to purple.

In the FIG. 11 test, the paint in the area indicated by vertical hatch lines at the top of the FIG. was red, indicating a pressure of about 0.48 on a scale of white being 0.55 and purple being 0.00. These values are ratios of local pressures to ambient. The yellow cross hatched area below the red area indicated a pressure of about 0.34 on the scale of the test. The green area immediately below the yellow area and represented by oblique hatch lines indicated a relative pressure of about 0.31 on the test scale. The blue horizontally lined area below the red area adjacent the apex of triangle 26 and extending along the length of side walls 28 and 30 inboard thereof, as well as outwardly from base 48 thereof, indicated a relative pressure of about no greater than about 0.10. The yellow area of the test below the lowermost margin of the blue zone also had a pressure of at least about 0.34.

Thus, the test results as depicted in FIG. 11 establish that a triangular low pressure zone is produced in the cavity 26, and that diverging vortices exist along the innermost edges of the upper margins 34 of side walls 28 and 30. Flow of supersonic air over the margins 34 of side walls 28 and 30 is schematically indicated by the curved arrows 54 of FIG. 3, thus producing the counter rotating, streamwise vortices 56 and 58 indicated by the dashed spiral lines of that figure and in FIG. 11. Because of the initiation of the counter rotating vortices produced by each cavity from the apex thereof, the spiral air flows along each side wall 28 and 30 tend to reinforce one another, thus increasing the strength of the diverging vortices.

Tests were conducted to verify the effectiveness of the triangular vortex generators 26 included the following parameters, which are depicted schematically in FIGS. 4, 5 and 5a.

| Height (in) | Base (in) | Depth (in) | Area Ratio[1] |
|---|---|---|---|
| 1.000 | 0.536 | 0.070 | 0.0328 |
| 1.000 | 0.536 | 0.141 | 0.0328 |
| 1.000 | 0.728 | 0.070 | 0.0446 |
| 1.000 | 0.728 | 0.141 | 0.0446 |
| 1.000 | 1.155 | 0.070 | 0.0707 |
| 1.000 | 1.155 | 0.141 | 0.0707 |
| 1.000 | 2.000 | 0.070 | 0.1224 |
| 1.000 | 2.000 | 0.141 | 0.1224 |
| 1.000 | 0.632 | 0.141 | 0.0707 |
| 0.500 | 0.364 | 0.070 | 0.0223 |
| 0.200 | 0.146 | 0.028 | 0.0286 |
| 0.200 | 0.146 | 0.028 | 0.0554 |

[1]Area Ratio is defined as the total planform area of all SSVGs divided by the area of the plate.

In addition, referring to FIG. 5, the vertex half angle θ of FIG. 5 of each cavity 26 should be maintained within the range of about 10° to about 60°. FIGS. 5 and 5a show that the cavities 26 function satisfactorily whether or not the side walls 28 and 30 are within, or outside of, the Mach cone.

The Mach angle μ (FIG. 5a) could vary in the range from about 90° to 10°. The incline angle δ (FIG. 4) of bottom wall 38 relative to horizonal is desirably maintained within the range of from about 4° to about 12°.

Each of the cavities 26 is preferably an isosceles triangular wherein each of the side walls 28 and 30 is at an angle of about 45° with respect to a bisector of the triangular cavity that is generally perpendicular to base portion 48. Furthermore, the ratio of the length of the base portion 48 of each cavity 26 to the height of each triangular cavity 26 (i.e., the length of a bisector of the triangular cavity that is generally perpendicular to base portion 48) is from about 0.35 to about 3.5. Preferably the ratio of the base to height is from about 0.5 to about 2.

The ratio of the depth of each triangular cavity 26 at apex portion 44 thereof relative to the height of the triangular cavity (i.e., the length of a bisector of the triangular cavity that is generally perpendicular to base portion 48) is from about 0.02 to about 0.25. The ratio of depth to height is preferably from about 0.07 to about 0.14.

The ratio of the total area of a series of triangular cavities 26 divided by the area of the surface in which the cavities are placed is from about 0.01 to about 0.2.

Figure 12:
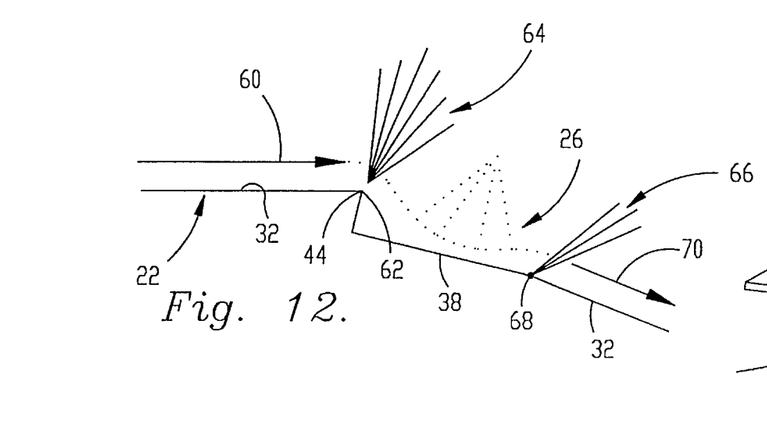
FIG. 12 is a schematic representation of the flow pattern of supersonic air across a triangular cavity of the type tested to produce the paint pattern of FIG. 11.

Viewing FIG. 12, it is to be observed that as the supersonic air stream 60 flows across surface 32 and encounters the corner 62 defined by the apex 44 of a cavity 26, an expansion fan 64 is produced radiating from corner 62. In like manner, an expansion fan 66 radiates from the corner 68 where bottom wall 38 merges with the surface 32 of the airfoil 22. These expansion fans, accompanied by the flow of air over margins 34 of side walls 30 and 32 of the cavity 26, cause the air stream to dip into the cavity 26 as depicted by the dotted lines. As a result, trailing air stream 70 to remain in conforming, engaging relationship with the surface 32 downstream of the cavity 26. Thus, it can be seen that each of the cavities 26 attenuates flow separation and attendant wave drag penalties that would otherwise result from the supersonic flow of air over the wing 22.

FIG. 2 illustrates a further embodiment of the vortex generating structure of the general type illustrated in FIG. 1, with the difference being the fact that the rows 140 and 142 of vortex generating cavities 126 extend the full span of wing 122. The orientation of the cavities 126 however remains the same as the orientation of the cavities 26 in rows 40 and 42.

Figures 6A, 6B, 7, 8, 9, 10A, 10B, 10C:
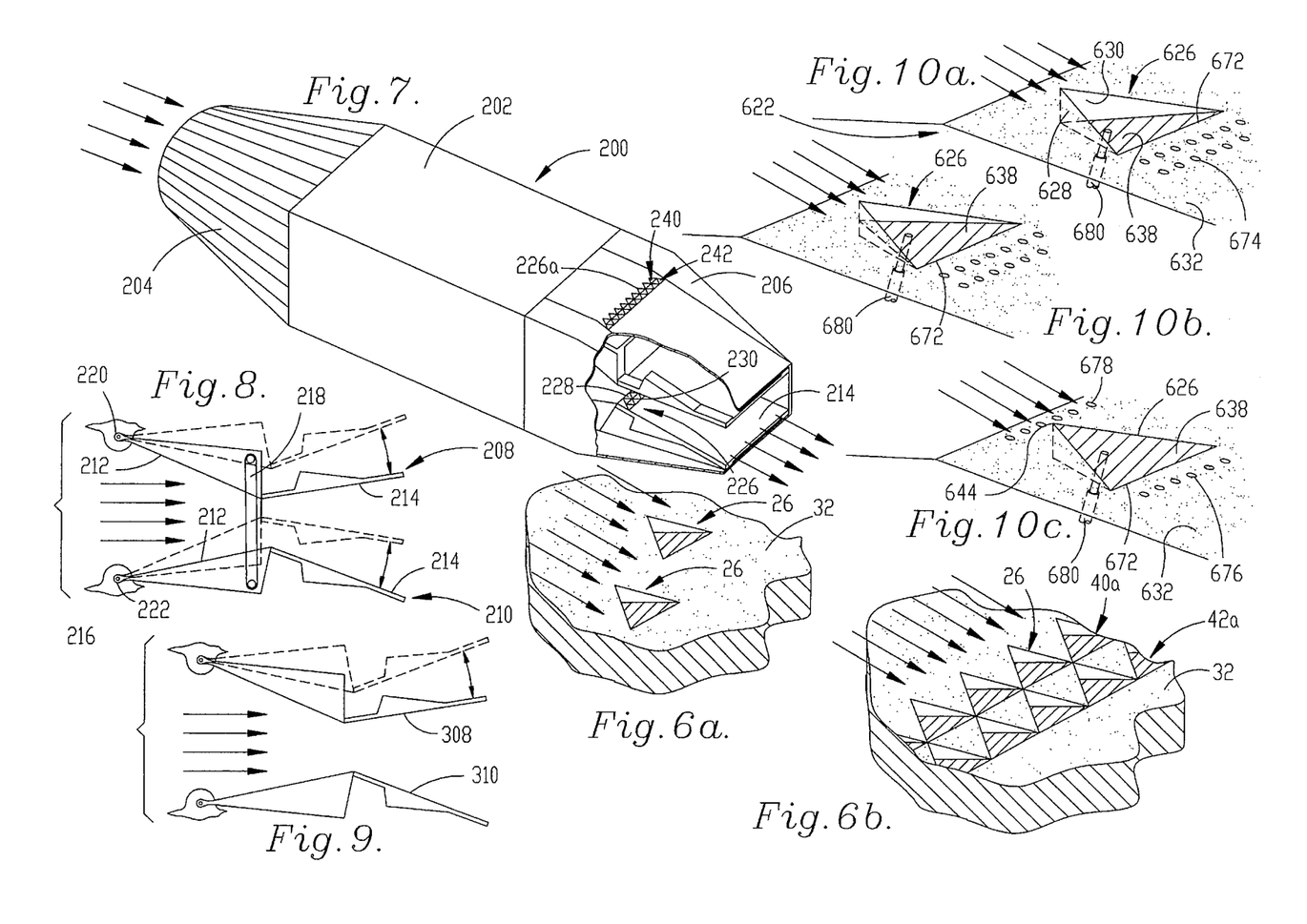
FIG. 6a is a schematic perspective view of a surface in which a series of triangular vortex generating cavities are recessed, and showing the offset relationship of the cavities with respect to the line of supersonic airflow.
FIG. 6b is a schematic perspective view similar to 6a but illustrating a second orientation of a series of the triangular vortex generating cavities.
FIG. 7 is a schematic perspective view of a jet propulsion engine illustrating the way in which the vortex generators hereof may be used on the outer exhaust duct structure of such engine, or on internally mounted exhaust gas deflection panels forming a part of the engine.
FIG. 8 is a fragmentary, schematic cross-sectional view of the exhaust gas deflector panels shown at the outlet of the engine of FIG. 7 and illustrating engine construction where the outlet panels are joined together for movement as a unit.
FIG. 9 is a view similar to FIG. 8 but illustrating outlet panels for a jet propulsion engine where only one of the panels is adapted to be selectively shifted with respect to the other opposed panel.
FIG. 10a is a fragmentary, schematic perspective view of a triangular vortex generating cavity for supersonic airflow applications with sensor controlled means being provided for shifting the bottom wall of the cavity relative to the side walls thereof in order to permit selective variation of the depth of the cavity, and illustrating the bottom wall in its fully retracted position.
FIG. 10b is a fragmentary, schematic perspective view similar to FIG. 10a and showing the cavity defining bottom wall in an intermediate position.
FIG. 10c is a fragmentary, schematic perspective view similar to FIGS. 10a and 10b but illustrating the bottom wall in its outer position flush with the surface of the airfoil, and also showing an alternate sensor arrangement.

FIG. 6a is a fragmentary, essentially schematic depiction of a pair of cavities 26 as provided one of the rows 40 and 42 of FIG. 1, while FIG. 6b shows an alternate embodiment wherein the two rows 40a and 42a of cavities 26 are adjacent one another with the apices of the cavities 26 of row 22a in direct alignment with adjacent corners of the base portions of the cavities 26 making up row 40a.

Another embodiment of the present invention is illustrated in FIGS. 7 and 8. Jet engine 200 has a main housing 202, an inlet duct 204, and an outlet duct 206. The engine 200 has two internal plate units 208 and 210 which are of dog leg configuration for illustration purposes only. Thus, each of the plates 208 and 210 has an innermost panel section 212 and an outer panel section 214. The panel sections 212 of plate units 208 and 210 converge as the panel sections 214 thereof are approached, while panel sections 214 diverge relatively as is depicted in FIG. 8. Hot exhaust gases 216 emitted by the gas turbine engine are exhausted through duct 206, and in so doing, flow over opposed inner surfaces of the panel sections 212 and 214.

In order to prevent flow separation of the supersonic hot discharge gases of the engine 200 from the innermost opposing surfaces of panel sections 214. As depicted in FIG. 7, two rows 228 and 230 of the vortex generators 226 are located on each of the panel sections 214 proximal to the zone of joinder thereof to a respective panel section 212. Each of the vortex generators 226 is of the same construction and configuration as vortex generators 26, with the specific size and depth of each vortex generator 226 being optimized for the particular jet engine application. Generally speaking, the vortex generators 226 have width, depth and angular parameters similar to the vortex generators 26 provided on airfoils 22 and 122.

The plate units 208 and 210 are shown as being connected by linkage 218 extending between panel sections 212 thereof. It is contemplated in this respect that mechanism be provided for shifting plate units 208 and 210 as a unit about respective pivot axes 220 and 222 to deflect the exhaust gases 216 emitted by the jet engine. In this manner, the direction of flow of the exhaust gases may be selectively controlled for maximum takeoff performance applications, and for maneuvering of an aircraft on which the jet engine 200 is mounted. For example, in the case of a military jet fighter, the provision of movable plate units 208 and 210 allows the pilot to have a further degree of control of his aircraft. Substantial speed variations are possible by selective shifting of the plate units 208 and 210. If the jet fighter is traveling at a high rate of speed and the pilot desires to significantly slow the aircraft down for tactical reasons during engagement, or to elude an armed device approaching his aircraft, this rapid change of air speed can be accomplished by shifting of the deflector plate units 208 and 210.

The vortex generators 226 are especially useful for exhaust gas deflectors of a gas turbine engine in order to prevent exhaust gas flow separation from occurring as the plate units 208 and 210 are rapidly shifted at the command of the pilot.

As depicted in FIG. 7, vortex generators 226a may be located in rows 240 and 242 thereof across the width of the outer surface of the exhaust duct 206 of jet engine 200, both at the top of the duct as well as the underside thereof. Again, these vortex generators serve to attenuate supersonic airflow separation over the outer surface of the outlet duct.

FIG. 9 illustrates an embodiment of the invention similar to that of the embodiment of FIG. 8 except that only the plate unit 308 is shiftable while the opposed plate unit 310 remains stationary. The plate units 308 and 310 however are provided with vortex generators located in the same positions as the rows 228 and 230 of vortex generators 226 spanning the width of respective plate units 208 and 210.

Figure 13:
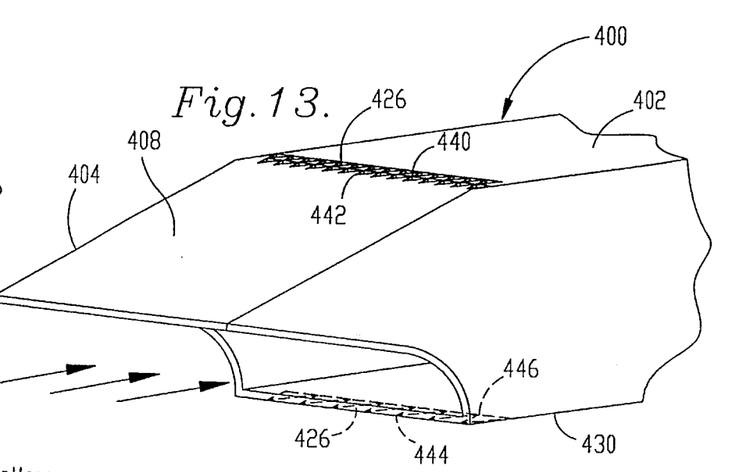
FIG. 13 is a fragmentary, schematic perspective view of the inlet of a type of jet propulsion device and illustrating typical locations for the vortex generators hereof.

FIG. 13 illustrates the inlet duct 404 of a jet engine 400 and it can be seen from that figure that a series of vortex generators 426 may be provided in rows 440 and 442 thereof at the point of juncture of the upper panel section 408 with the housing 402. Similarly, two rows 444 and 446 of vortex generators 426 may be provided on the underside 430 of the inlet duct 404. The vortex generators 426 similarly function to limit separation of supersonic airflow from the surfaces of the inlet duct 404.

Figure 14:
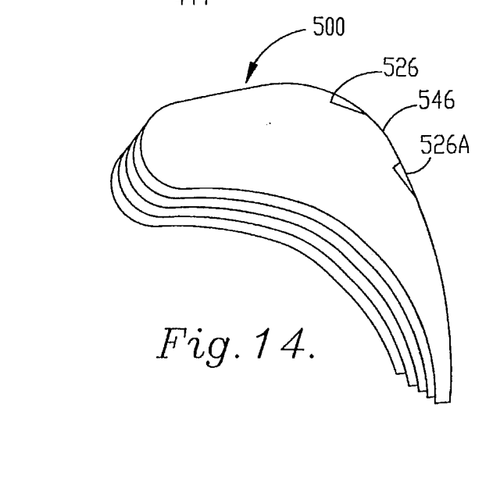
FIG. 14 is a fragmentary, schematic perspective depiction of turbine or compressor blades which incorporate the present supersonic vortex generators.

FIG. 14 shows a series of turbine or compressor blades 500 forming a part of a turbine or compressor unit (not shown). These blades may also be provided with vortex generators 526 and 526a in the leading edges 546 thereof. The vortex generators 526 and 526a are located along the length of each leading edge 546 in positions where supersonic air tends to separate from the surfaces during high speed rotation of the turbine or compressor rotor. Vortex generators 526 and 526a are of essentially the same size and depth as vortex generators 26 previously described.

Each of the vortex generators may be provided with a shiftable bottom wall if desired for variation of the depth of the triangular cavity. For example, as shown in FIGS. 10a, 10b and 10c, respectively, the triangular vortex generating cavity 626 in surface 632 of structure 622 has triangular side walls 628 and 630 similar to side walls 28 and 30 vortex generators 26. However, the triangular bottom wall 638 of vortex generator 626 is movable about the axis of hinge 672 from the fully retracted position thereof as depicted in FIG. 10a, through intermediate positions as shown schematically by the depiction of FIG. 10b, to the outermost location thereof as illustrated in FIG. 10c where the bottom wall 638 is flush with surface 632.

A series of pressure sensors 674 may be recessed in surface 632 downstream of hinge 672 as shown in FIGS. 10a and 10b, or in the alternative, sensors 676 and 678 may be positioned downstream of hinge 676 and upstream of apex 644 as shown in FIG. 10c. The sensors are operably associated with actuating mechanism 680 connected to bottom wall 638 for shifting the latter from the retracted position of 10a through a selected displacement to the flush position of FIG. 10c.

Each actuator 680 associated with respective sensors 674 or the combination of sensors 676 and 678 is connected to controller 682 (FIG. 15) which receives input from sensors 674 (676, 678) via connection 684. Controller 682 is operable to actuate actuators 680 in response to the pressure sensed by respective sensors 674 (676, 678).

As the pressure sensed by sensors 674 increases, the corresponding actuators 680 under control of controller 682 are operated to shift the bottom wall 638 of each vortex generator 626 toward the extended position thereof flush with surface 632. In like manner, as the pressure sensed by sensors 674 decreases, the controller and bottom wall actuating mechanism 680 moves the bottom wall 638 of each vortex generator 626 toward the fully retracted position thereof as illustrated in FIG. 10a.

The sensors 676 and 678 of the embodiment illustrated in FIG. 10c are utilized to sense a differential pressure upstream and downstream of the vortex generators 626. When that differential reaches predetermined values, as established by the computer of controller 682, the bottom walls 638 of each vortex generator 626 are shifted accordingly. A differential pressure indicating decreasing pressure downstream of the vortex generating cavity results in shifting of the associated bottom wall of the cavity toward the fully retracted position thereof. Similarly, a differential pressure indicative of a higher downstream pressure causes the controller to shift the bottom wall of the cavity toward its flush position with the airfoil surface.

We claim:

1. A vortex generator for attenuating flow separation which occurs during supersonic flow of fluid in one direction over the surface of a component from the leading edge of the component toward the trailing edge portion thereof, said vortex generator comprising:

structure presenting a cavity in the component located below said surface thereof downstream of said leading edge and upstream of the point on the surface where flow separation would occur without said cavity, said cavity being defined at least in part by elongated side wall means located in disposition with a major transverse axis thereof extending inwardly of the component from said surface and thereby presenting an elongated margin joining the side wall means to said surface of the component, said side wall means further being positioned such that a longitudinal axis thereof and thereby said margin are at an angle with respect to the flow of the fluid in said one direction across said surface of the component; and bottom wall means on the structure, connected to said side wall means, and forming the bottom of the cavity, said angle being sufficient to cause fluid flowing across the surface of the component from the leading edge and over said margin to generate a spiral vortex trailing therefrom which attenuates said flow separation, said cavity being of generally triangular configuration defined at least in part by two of said side wall means, each of said side wall means having a margin which merges with the surface of the component, both of said side wall means being connected to said bottom wall means and diverging from one another as the trailing edge portion of the component is approached to cause diverging spiral vortices to be generated by fluid flowing across the surface of the component from the leading edge and over respective margins of corresponding side wall means, said triangular cavity having an apex portion and an opposed base portion with the apex portion thereof being in closest proximity to the leading edge of the component, the bottom wall means being located to cause the cavity to be of greater depth adjacent the apex portion thereof than at the base portion of the cavity.

2. A vortex generator as set forth in claim 1, wherein each of the side wall means is at an angle of from about 10° to about 60° with respect to a bisector of the triangular cavity.

3. A vortex generator as set forth in claim 1, wherein each of the side wall means is at an angle of from about 10° to about 60° with respect to a bisector of the triangular cavity that is generally perpendicular to said base portion of the cavity.

4. A vortex generator as set forth in claim 1, wherein each of the side wall means is at an angle of about 45° with respect to a bisector of the triangular cavity that is generally perpendicular to said base portion of the cavity.

5. A vortex generator as set forth in claim 1, wherein the ratio of the length of the base portion of the cavity to the length of a bisector of the triangular cavity that is generally perpendicular to said base portion of the cavity, is from about 0.35 to about 3.5.

6. A vortex generator as set forth in claim 5, wherein the ratio of the length of the base portion of the cavity to the length of a bisector of the triangular cavity that is generally perpendicular to said base portion of the cavity, is from about 0.5 to about 2.

7. A vortex generator as set forth in claim 1, wherein the ratio of the depth of the cavity to the length of a bisector of the triangular cavity that is generally perpendicular to the said base portion of the cavity, is from about 0.02 to about 0.25.

8. A vortex generator as set forth in claim 7, wherein the ratio of the depth of the cavity to the length of a bisector of the triangular cavity that is generally perpendicular to the said base portion of the cavity, is from about 0.07 to about 0.14.

9. A vortex generator as set forth in claim 1, wherein said bottom wall means merges with said surface of the component adjacent said base portion of the cavity.

10. A vortex generator as set forth in claim 1, wherein said side wall means converge at said apex portion of the cavity to define an elongated line of merger therebetween, the longitudinal axis of said merger line being at an angle with respect to a plane through said bottom wall means.

11. A vortex generator as set forth in claim 1, wherein said cavity is generally of isosceles triangular configuration.

12. A vortex generator as set forth in claim 11, wherein the angle between each of side wall means and a bisector of said isosceles triangle is from about 10° to about 60°.

13. A vortex generator as set forth in claim 1, wherein is provided a plurality of cavities in said surface, each of said cavities being oriented with respective side wall means thereof at an angle sufficient to cause fluid flowing across the surface of the component from the leading edge and over corresponding margins to each generate a spiral vortex trailing therefrom which attenuates said flow separation.

14. A vortex generator as set forth in claim 13, wherein the ratio of the total area of the triangular cavities divided by the area of said surface is from about 0.01 to about 0.2.

15. A vortex generator as set forth in claim 14, wherein the ratio of the total area of the triangular cavities divided by the area of said surface is from about 0.03 to about 0.125.

16. A vortex generator as set forth in claim 13, wherein said plurality of cavities present a row of cavities in generally side-by-side relationship transversely of said one direction of fluid flow over the surface of the component.

17. A vortex generator as set forth in claim 16, wherein the cavities of said row thereof are in spaced, staggered relationship transversely of said one direction of fluid flow over the surface of the component.

18. A vortex generator as set forth in claim 16, wherein adjacent, staggered cavities of said row thereof overlap one another in said one direction of fluid flow over the surface of the component.

19. A vortex generator as set forth in claim 1, wherein is provided selectively operable means for shifting the bottom wall means relative to said surface of the component to vary the depth of the cavity.

20. A vortex generator as set forth in claim 11, wherein said bottom wall shifting means is operable to selectively move the bottom wall means into a position substantially flush with the surface of the component.

21. A vortex generator as set forth in claim 19, wherein the bottom wall means is shiftable from one position causing the cavity to be of greater depth adjacent the apex portion thereof than at the base portion of the cavity, to another position where the bottom wall means is substantially flush with the surface of the component.

22. A vortex generator as set forth in claim 21, wherein is provided pressure sensing means mounted on the surface of the component for controlling operation of the bottom wall shifting means to shift the bottom wall in response to the pressure sensed by said pressure sensing means.

23. A vortex generator as set forth in claim 19, wherein said pressure sensing means and the bottom wall shifting means are operable to effect shifting of the bottom wall away from a position in substantially flush relationship to the surface of the component in response to an increase in pressure on the component surface as sensed by the pressure sensing means.

24. A vortex generator as set forth in claim 23, wherein is provided pressure sensing means on the component fore and aft of the cavity relative to the direction of flow of the fluid over the component.

25. A vortex generator as set forth in claim 24, wherein said fore and aft sensing pressure means are operable in association with the bottom wall shifting means to shift the bottom wall means in response to a predetermined difference in pressure sensed by said fore and aft sensing means respectively.

26. A vortex generator for attenuating flow separation which occurs during supersonic flow of fluid in one direction over surfaces each having a leading edge and trailing edge portion of opposed nozzle components cooperating to form a part of the outlet of a jet propulsion unit, said vortex generator comprising:

structure presenting a cavity in each of the components, said cavities being located below said surfaces of respective components downstream of the leading edges thereof and upstream of the points on the surfaces where flow separation would occur without said cavity, said cavities each being defined at least in part by elongated side wall means located in disposition with a major transverse axis thereof extending inwardly of a respective component from said surface thereof and thereby presenting an elongated margin joining a corresponding side wall means to a respective surface of the component, each of said side wall means further being positioned such that a longitudinal axis thereof and thereby corresponding margins are at an angle with respect to the flow of the fluid in said one direction across said surfaces of respective components;

bottom wall means on each of the structures, connected to respective side wall means, and forming the bottom of corresponding cavities, said bottom wall of each cavity being positioned at an angle relative to respective surfaces causing the greatest depth of each cavity to be located in facing relationship to the fluid flow over the surfaces and for the trailing portion of respective bottom walls downstream of the fluid flow across each cavity to merge smoothly with corresponding surfaces upstream of said points on the surfaces, each of said angles being sufficient to cause fluid flowing across respective surfaces of the components from the leading edges thereof and over said margins to generate a corresponding spiral vortex trailing therefrom which attenuates said flow separation; and means for selectively shifting at least one of the components to alter the direction of the outgoing supersonic flow of fluid from the jet propulsion unit.

27. A vortex generator for attenuating flow separation which occur(s) during supersonic flow of fluid in one direction over surfaces each having a leading edge and trailing edge portion of opposed nozzle components cooperating to form a part of the outlet of a jet propulsion unit, said vortex generator comprising:

structure presenting a cavity in each of the components, said cavities being located below said surfaces of respective components downstream of the leading edges thereof and upstream of the points on the surfaces where flow separation would occur without said cavity, said cavities each being defined at least in part by elongated side wall means located in disposition with a major transverse axis thereof extending inwardly of a respective component from said surface thereof and thereby presenting an elongated margin joining a corresponding side wall means to a respective surface of the component, each of said side wall means further being positioned such that a longitudinal axes thereof and thereby corresponding margins are at an angle with respect to the flow of the fluid in said one direction across said surfaces of respective components; and bottom wall means on each of the structures, connected to respective side wall means, and forming the bottom of corresponding cavities, said bottom wall of each cavity being positioned at an angle relative to respective surfaces causing the greatest depth of each cavity to be located in facing relationship to the fluid flow over the surfaces and for the trailing portion of respective bottom walls downstream of the fluid flow across each cavity to merge smoothly with corresponding surfaces upstream of said points on the surfaces, each of said angles being sufficient to cause fluid flowing across respective surfaces of the components from the leading edges thereof and over said margins to generate a corresponding spiral vortex trailing therefrom which attenuates said flow separation.

28. A vortex generator for attenuating flow separation which occur during supersonic flow of fluid in one direction over a surface having a leading edge and trailing edge portion of a nozzle component forming a part of the inlet of a jet propulsion unit, said vortex generator comprising:

structure presenting a series of cavities in the component across the width thereof and each located below said surface thereof downstream of said leading edge and upstream of the point on the surface where flow separation would occur without said cavity, said cavities each being defined at least in part by elongated side wall means located in disposition with a major transverse axis thereof extending inwardly of the component from said surface and thereby presenting an elongated margin joining the side wall means to said surface of the component, each of said side wall means further being positioned such that a longitudinal axes thereof and thereby said margin are at an angle with respect to the flow of the fluid in said one direction across said surface of the component; and bottom wall means on the structure, connected to said side wall means, and forming the bottom of corresponding cavities, said bottom wall of each cavity being positioned at an angle relative to said surface causing the greatest depth of each cavity to be located in facing relationship to fluid flow over the surface and for the trailing portion of the bottom wall of each cavity downstream of the fluid flow across the cavities to merge smoothly with the surface upstream of said point on the surface, said angle being sufficient to cause fluid flowing across the surface of the component from the leading edge and over said margin to generate a spiral vortex trailing therefrom which attenuates said flow separation.

29. A vortex generator for attenuating flow separation which occurs during supersonic flow of fluid in one direction over the surface of a component from the leading edge of the component toward the trailing edge portion thereof, said vortex generator comprising:

structure presenting a cavity in the component located below said surface thereof downstream of said leading edge and upstream of the point on the surface where flow separation would occur without said cavity, said cavity being defined at least in part by elongated side wall means located in disposition with a major transverse axis thereof extending inwardly of the component from said surface and thereby presenting an elongated margin joining the side wall means to said surface of the component, said side wall means further being positioned such that a longitudinal axis thereof and thereby said margin are at an angle with respect to the flow of the fluid in said one direction across said surface of the component; and bottom wall means on the structure, connected to said side wall means, and forming the bottom of the cavity, said bottom wall of the cavity being positioned at an angle relative to said surface causing the greatest depth of the cavity to be located in facing relationship to fluid flow over the surface and for the trailing portion of the bottom wall downstream of the fluid flow across the cavity to merge smoothly with the surface upstream of said point on the surface, said angle being sufficient to cause fluid flowing across the surface of the component from the leading edge and over said margin to generate a spiral vortex trailing therefrom which attenuates said flow separation.

30. A vortex generator is set forth in claim 29, wherein said side wall means is positioned such that the angle thereof with respect to the flow of the fluid in said one direction is from about 10° to about 60°.

* * * * *